(12) United States Patent
Nishimori

(10) Patent No.: US 8,768,321 B2
(45) Date of Patent: Jul. 1, 2014

(54) COMMUNICATION SYSTEM, RADIO COMMUNICATION TERMINAL AND DISPLAY CONTROL METHOD

(75) Inventor: Masanori Nishimori, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1085 days.

(21) Appl. No.: 12/162,321

(22) PCT Filed: Jan. 24, 2007

(86) PCT No.: PCT/JP2007/051101
§ 371 (c)(1),
(2), (4) Date: Apr. 2, 2010

(87) PCT Pub. No.: WO2007/086437
PCT Pub. Date: Aug. 2, 2007

(65) Prior Publication Data
US 2010/0203875 A1    Aug. 12, 2010

(30) Foreign Application Priority Data

Jan. 27, 2006  (JP) ............................... P2006-019483

(51) Int. Cl.
*H04M 3/42*    (2006.01)
(52) U.S. Cl.
USPC ........................... 455/416; 455/518; 455/519
(58) Field of Classification Search
USPC .......................................... 455/416, 518, 519
See application file for complete search history.

(56) References Cited

U.S. PATENT DOCUMENTS

| | | | |
|---|---|---|---|
| 6,873,854 B2 | 3/2005 | Crockett et al. | |
| 2003/0153339 A1 | 8/2003 | Crockett et al. | |
| 2004/0082352 A1* | 4/2004 | Keating et al. | 455/519 |
| 2005/0266869 A1* | 12/2005 | Jung | 455/518 |
| 2006/0014556 A1* | 1/2006 | Park et al. | 455/518 |
| 2006/0128411 A1* | 6/2006 | Turcanu | 455/518 |
| 2006/0140173 A1* | 6/2006 | Hoover | 370/352 |
| 2006/0246934 A1* | 11/2006 | Patel et al. | 455/519 |

FOREIGN PATENT DOCUMENTS

| | | |
|---|---|---|
| JP | 2005535156 A | 11/2005 |
| KR | 2005-0114556 | 12/2005 |

OTHER PUBLICATIONS

Notice of Preliminary Rejection for Korean application No. 10-2008-7019423.
International Search Report for corresponding PCT application PCT/JP2007/051101 lists the references above.

* cited by examiner

*Primary Examiner* — Jinsong Hu
*Assistant Examiner* — Jean Chang
(74) *Attorney, Agent, or Firm* — DLA Piper LLP (US)

(57) ABSTRACT

A SIP server generates a second call request for calling out group talk members corresponding to a first call request on the basis of the received first call request. Prior to transmitting the generated second call request to the group talk members, the SIP server transmits call request receiving information indicating that the first call request has been received. An SMS server transmits a start-up message to the group talk members on the basis of the received call request receiving information. The start-up message is used to start up an application which executes a group talk, and includes the member identification information of the group talk.

4 Claims, 9 Drawing Sheets

FIG. 7

```
INVITE sip:userA@example.org SIP/2.0
Via:SIP/2.0/UDP sip.example.org:branch=z9hG4bKabcd
To:sip:userA@example.org
From:sip:userD@example.org
Call-ID:sip:1234@example.org
CSeq:1 INVITE
Contact:<sip:userA@example.org>
Content-Type:application/group-info+xml
Contennt-Length:128

<?xml version="1.0"encoding="UTF-8">
<group-info>
    <num="0901111111"/>       ----, M
    <num="0902222222"/>
    <num="0903333333"/>
</group-info>
```

COMMUNICATION SYSTEM, RADIO COMMUNICATION TERMINAL AND DISPLAY CONTROL METHOD

CROSS-REFERENCE TO RELATED APPLICATIONS

This application is a national stage of international application no. PCT/JP2007/051101, filed on Jan. 24, 2007, and claims the benefit of priority under 35 USC 119 of Japanese patent application no. 2006-019483, filed on Jan. 27, 2006. The entire contents of these applications are incorporated herein by reference.

TECHNICAL FIELD

The present invention relates to a communication system enables a radio communication terminal to execute a call simultaneously with multiple radio communication terminals, and a radio communication terminal and a display control method used in the communication system.

BACKGROUND ART

In recent years, PTT (Push-To-Talk) service has been introduced as one of the voice call services in which one radio communication terminal (cellular phones and the like) can simultaneously communicate with multiple radio communication terminals (group talk) in the same way as a conventional transceiver (see, for example, Patent Document 1). In the PTT service, when one user among the multiple radio communication terminals participating in the group talk speaks while pressing a button on the user's terminal, voice data related to the speech is transmitted to the other radio communication terminals that participate in the group talk.

Meanwhile, the PTT service using SIP (Session Initiation Protocol) has started to provide a service for displaying the identification information of multiple radio communication terminals already participating in a group talk (member identification information such as phone numbers, IP addresses or user names) on a destination terminal that is about to join the group talk.

More specifically, first of all, any ones terminal (originating terminal) among the multiple radio communication terminals (for example, radio communication terminals #A, #B and #C) that already participate in a group talk transmits a call request (INVITE Request) to a SIP server to call out a destination terminal that has not yet participated in the group talk.

Then, on the basis of the call request (INVITE Request) received from the originating terminal, the SIP server generates a call request (INVITE Request) for the destination terminal. The SIP server transmits the generated call request (INVITE Request) to the destination terminal after the completion of a login processing such as registering the location of the destination terminal in response to the request from the destination terminal.

With such processing, the destination terminal displays the member identification information included in the call request (INVITE Request) received from the SIP server (for example, phone numbers and user names of the radio communication terminals #A, #B and #C).

Patent Document 1: Japanese Patent Translation Publication No. 2005-535156

DISCLOSURE OF THE INVENTION

However, since the above-mentioned destination terminal is able to receive the call request (INVITE Request) from the SIP server only after the completion of the login processing to the SIP server, the destination terminal is not able to acquire the member identification information included in the call request (INVITE Request) from the SIP server, without having a delay due to the execution of such login processing.

Also, the destination terminal may not be able to complete a login processing to the SIP server because the destination terminal is not always ready to communicate with the SIP server. In this case, the destination terminal needs considerable time until it receives the call request (INVITE Request) from the SIP server, causing even more delay in acquiring the member identification information included in the call request (INVITE Request).

The present invention is made in consideration of the above mentioned circumstances. An object of the present invention is to provide a communication system, a radio communication terminal and a display control method in which a destination terminal is able to promptly receive member identification information even when the destination terminal has not yet execute a login processing to the SIP server.

In order to solve the above mentioned problem, a first aspect of the present invention is a communication system that enables a group talk, comprising: a call control server (for example, a SIP server 100); and a message transmission server (for example, an SMS server 200), in which the call control server comprises: a call request receiver (for example, a call request receiver 103) configured to receive a first call request for calling out group talk members; a call request generator (for example, a call request generator 107) configured to generate a second call request for calling out the group talk members corresponding to the first call request, on the basis of the received first call request; and a call request transmitter (for example, a call request transmitter 109) configured to transmit call request receiving information indicating that the first call request is received prior to transmitting the generated second call request to the group talk members, in which the message transmission server comprises: an information receiver (for example, an information receiver 201) configured to receive the call request receiving information transmitted from the call control server; and a start-up message transmitter (for example, a start-up message transmitter 203) configured to transmit a start-up message, which includes member identification information of the group talk, for starting up an application which executes the group talk to the group talk members on the basis of the received call request receiving information.

According to such an aspect, since a start-up message includes the member identification information, even when a login processing to the call control server is not executed, a radio communication terminal is able to acquire the member identification information promptly from the start-up message received before the login processing.

A second aspect of the present invention comprises: a storage unit configured to store incoming call refusal information for refusing an incoming call; a receiver configured to receive a start-up message for starting up a login processing to a group talk system, from a message transmission server; and a display unit configured to display that the start-up message includes the incoming call refusal information when the incoming call refusal information includes identification information contained in the start-up message received by the receiver.

According to such an aspect, the radio communication terminal displays that a start-up message contains the identification information of incoming call refusal when the start-up message contains the identification information for refusing incoming call. Therefore, a user of the radio communication terminal is able to recognize that there is a user who intends to refuse to participate in a group talk, so that the user can properly decide whether or not to respond to the call from the originating terminal.

A third aspect of the present invention comprises: a controller configured to control such that the login processing to the group talk system is not started when the start-up message contains the incoming call refusal information.

According to such an aspect, the radio communication terminal can be configured not to execute an unnecessary login processing to the group talk system when is found that there is a person to be refused in a group talk after receiving a start-up message.

A fourth aspect of the present invention is a display control method, comprising the steps of: on the basis of member identification information for a group talk contained in a start-up message for starting the group talk and a login processing to the group talk system, and on the basis of member identification information for the group talk which is notified after the login processing to the group talk system, determining whether or not there is a difference between the member identification information notified after the login processing and the member identification information contained in the start-up message; and displaying a fact that there is the difference when the difference exists.

According to such an aspect, a radio communication terminal is able to display, if any, that there has been a change in the number of the radio communication terminals which are involved in a group talk during the time between the receipt of a start-up message and the receipt of the identification information from the group communication system after the login processing.

Thus, a user of a radio communication terminal is able to decide whether or not to participate in a group talk knowing that there has been a change in the number of the radio communication terminals that are involved in the group talk, so that the user can talk with desired users more properly.

BRIEF DESCRIPTION OF THE DRAWINGS

FIG. 7 is a diagram showing the contents of member identification information according to the first embodiment.

BEST MODE FOR CARRYING OUT THE INVENTION

[First Embodiment]
(Communication System)

The configuration of the communication system according to this embodiment of the present invention will now be described with reference to FIGS. 1 to 4.

Figure 1:
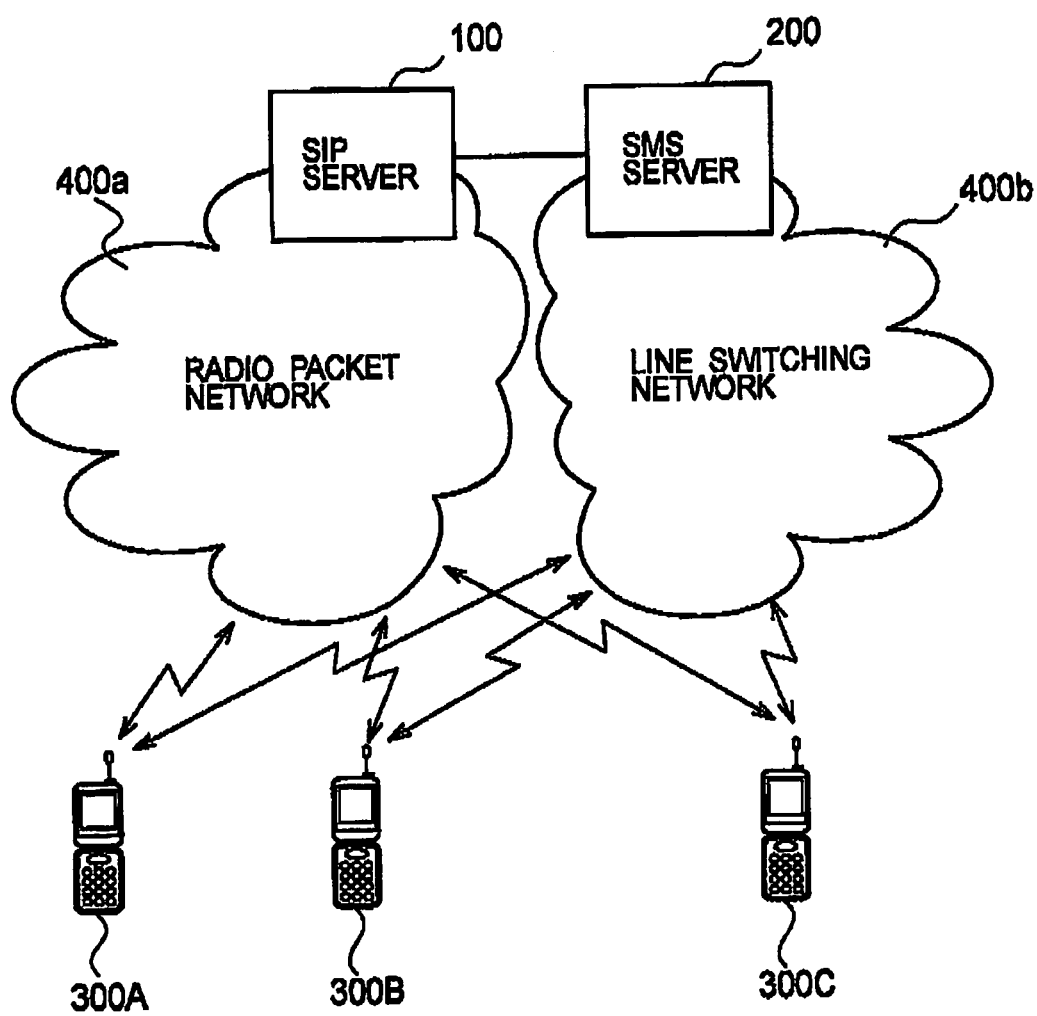
FIG. 1 is a schematic configuration diagram of a communication system according to a first embodiment.

As shown in FIG. 1, the communication system comprises a SIP server 100 and an SMS (Short Message Service) server 200. The radio communication terminals 300A to 300C according to this embodiment are configured to be connectable to the SIP server 100 and the SMS server 200 via a radio packet network 400a and a line switching network 400b.

The SIP server 100 is a call control server which calls a radio communication terminal (for example, a radio communication terminal #D: destination terminal) after completing a login processing of the radio communication terminal (destination to terminal) which is not participating in a group talk. The group talk is a call in which one radio communication to terminal (for example, a radio communication terminal #A) communicates with multiple radio communication terminals (for example, radio communication terminals #B and #C) simultaneously. In addition, the destination terminal configures group talk members.

Figure 2:
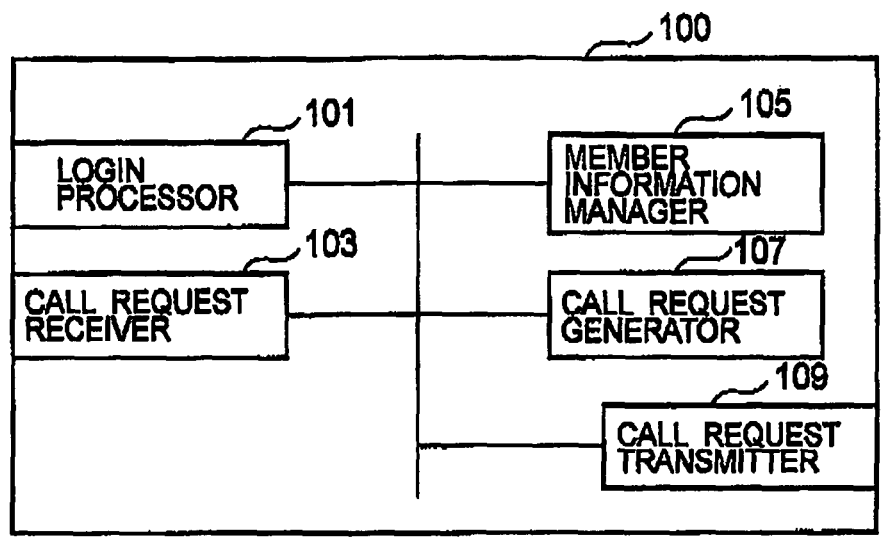
FIG. 2 is an internal structure diagram of a SIP server according to the first embodiment.

As shown in FIG. 2, the SIP server 100 comprises a login processor 101, a call request receiver 103, a member information manager 105, a call request generator 107 and a call request transmitter 109.

The login processor 101 executes login processing such as a location registration of the radio communication terminal (registration of IP address, phone number, user ID, or the like) in response to the request from the radio communication terminal 300.

The call request receiver 103 receives a first call request (INVITE Request; see S201 described later, shown in FIG. 6) to call the radio communication terminal (for example, the radio communication terminal #D; destination terminal) which is not participating in the group talk.

A member information manager 105 manages the identification information of radio communication terminals of which the login process has been complete. The identification information includes phone numbers, IP addresses or user names and the like.

The call request generator 107 generates a second call request (INVITE Request; see S211 described later, shown in FIG. 6) for the radio communication terminal (for example, the radio communication terminal #D: destination terminal) corresponding to the first call request on the basis of the received-first call request.

The call request transmitter 109 transmits, to an BM server 200, call request receiving information which indicates that the first call request has been received prior to transmission of the generated second call request to the radio communication terminal (for example, the radio communication terminal #D: destination terminal).

The call request receiving information in this embodiment contains member identification information of a group talk. The member identification information is identification information of non-group talk terminals or group talk terminals.

Here, non-group talk terminals include a radio communication terminal (destination terminal) which has not joined a group talk but is called by an originating terminal and the originating terminal which is the source of the first call request. The group talk terminals include an originating terminal and radio communication terminals which are participating in a group talk with the originating terminal.

After the completion of the login processing of a radio communication terminal (destination terminal) in response to a request from a radio communication terminal (destination terminal) which is a destination of the first call request (INVITE Request), the SIP server 100 transmits the identification information (member identification information) of group talk terminals or non-group talk terminals, which are to be involved in a group talk when the SIP server 100 receives the first call request (INVITE Request), to a radio communication terminal (for example, the radio communication terminal #D: destination terminal).

When the identification information (member identification information) of the group talk terminals or the non-group talk terminals is changed during the period after the SIP server 100 receives the first call request (INVITE Request) before the SIP server 100 transmits the second call request, the SIP server 100 also transmits the second call request (INVITE Request) to a radio communication terminal (for example, the radio communication terminal #D: destination terminal). The transmitted second call request (INVITE Request) includes change information which indicates that there has been a change in the number of the non-group talk terminals or the group talk terminals, which are to be involved in the group talk.

The change information includes information showing the member identification information (for example, the identification information of radio communication terminal #A and #B) during the period after the SIP server 100 receives the first call request (INVITE Request) before the SIP server 100 transmits the second call request.

Instead, the change information includes information showing only the identification information of a radio communication terminal (for example, the identification information of the radio communication terminal #C), which is the member identification information (for example, the identification information of the radio communication terminal #A, #B and #C) at a time when the SIP server 100 receives the first call request, excluding the member identification information (for example, the identification information of the radio communication terminal #A and #B) after the SIP server 100 receives the first call request.

An SMS server 200 provides a message service (short message service). The SMS server constitutes a message transmission server.

Figure 3:
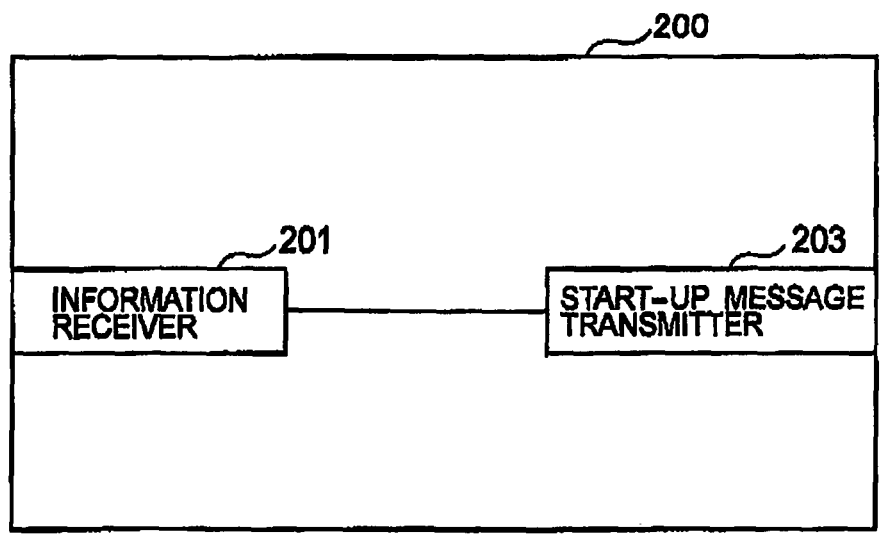
FIG. 3 is an internal structure diagram of an SMS server according to the first embodiment.

As shown in FIG. 3, the SMS server 200 comprises an information receiver 201 and a start-up message transmitter 203.

The information receiver 201 receives call request receiving information transmitted from the SIP server 100.

A start-up message transmitter 203 transmits a start-up message to a radio communication terminal (for example, the radio communication terminal #D: destination terminal) on the basis of the received call request receiving information. The start-up message starts up an application which executes a group talk. Alternatively, the start-up message starts up the login processing to the SIP server 100 (a group talk system).

The start-up message in this embodiment contains the same member identification information as the member identification information included in the call request receiving information.

Each of the radio communication terminals 300A to 300C is able to participate in a group talk following the, SIP procedure. The structures of the radio communication terminals 300A to 300C are essentially the same. The radio communication terminals 300A to 300C will be referred to as a radio communication terminal 300 to describe the structures of the radio communication terminals 300A to 300C.

Figure 4:
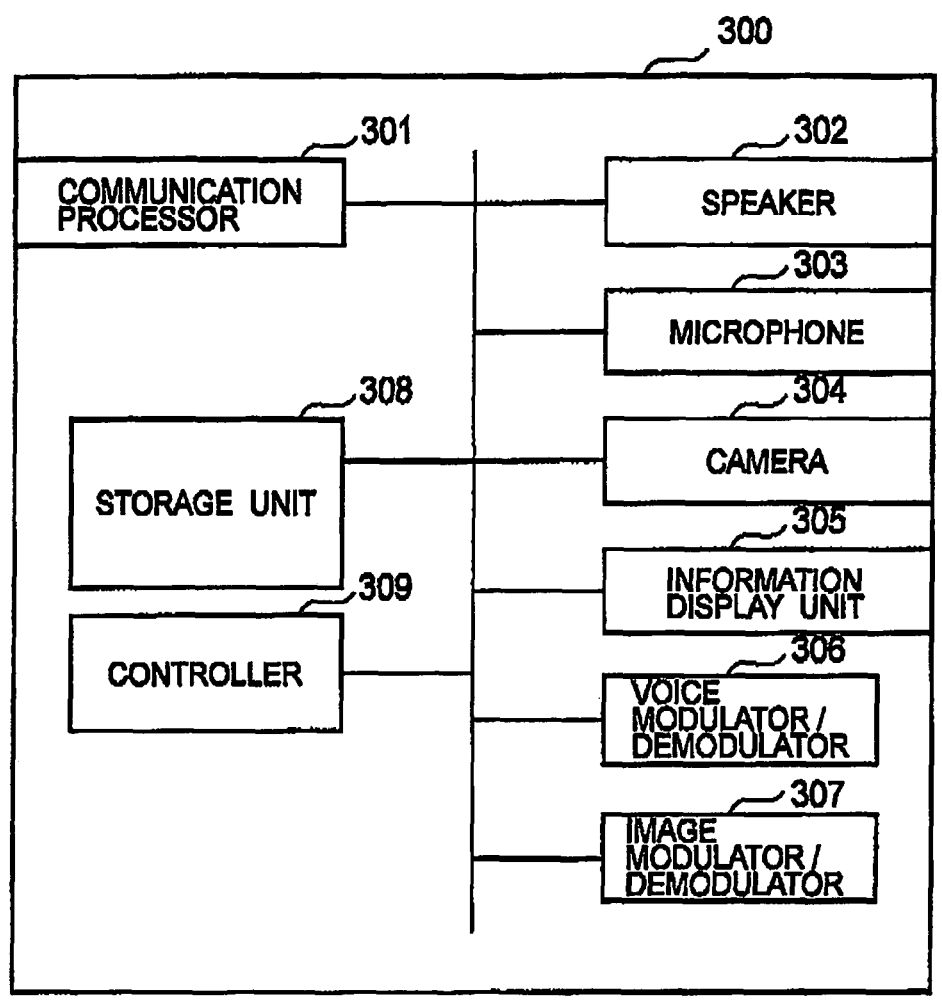
FIG. 4 is an internal structure diagram of a radio communication terminal according to the first embodiment.

As shown in FIG. 4, the radio communication terminal 300 comprises a communication processor 301, a speaker 302, a microphone 303, a camera 304, an information display unit 305, a voice modulator/demodulator 306, an image modulator/demodulator 307, a storage unit 308 and a controller 309.

Following the SIP procedure, the communication processor 301 transmits the first call request (INVITE Request) to a radio communication terminal (destination terminal) which is not participating in a group talk. With the first call request (INVITE Request), a radio communication terminal in a group talk calls the radio communication terminal (destination terminal) which is not participating in a group talk after the start of a group talk.

The communication processor 301 or controller 309 executes login processing to the SIP server 100 following the SIP procedure.

The communication processor 301 displays miscompare information on the information display unit 305 on the basis of the identification information included in the start-up message received from the SMS server 200 and the change information included in the second call request (INVITE Request) received from the SIP server 100. The miscompare information indicates that there has been a change in the number of the non-group talk terminals or the group talk terminals. Specifically, the miscompare information includes the identification information of the radio communication terminals which left the group talk or the number thereof and the like.

For example, when there is a difference between the member identification information (change information) given after the login processing to the SIP server 100 (group talk system) and the member identification information included in the start-up message, the communication processor 301 displays such information as miscompare information on the basis of the member identification information included in the received start-up message and the member identification information given after login processing.

The communication processor 301 may transmit the first call request (INVITE Request) to a radio communication terminal (destination terminal) following the SIP procedure. With the first call request (INVITE Request), a radio communication terminal which is not in a group talk may call a radio communication terminal (destination terminal) which is not participating in a group talk The speaker 302 outputs audio (such as voice, music and the like). The microphone 303 acquires the ambient sound around the radio communication terminal 300. The camera 304 generates image data corresponding to the photographic subject.

The information display unit 305 displays information including texts, images, member identification information (described later) and the like. The voice modulator/demodulator 306 decodes voice data included in a received packet and encodes sound data acquired by the microphone 303 and the like.

The image modulator/demodulator 307 decodes image data included in a received packet and encodes image data generated from the camera 304 and the like. The storage unit 308 stores received member identification information and the like.

(Communication Method)

Figure 5:
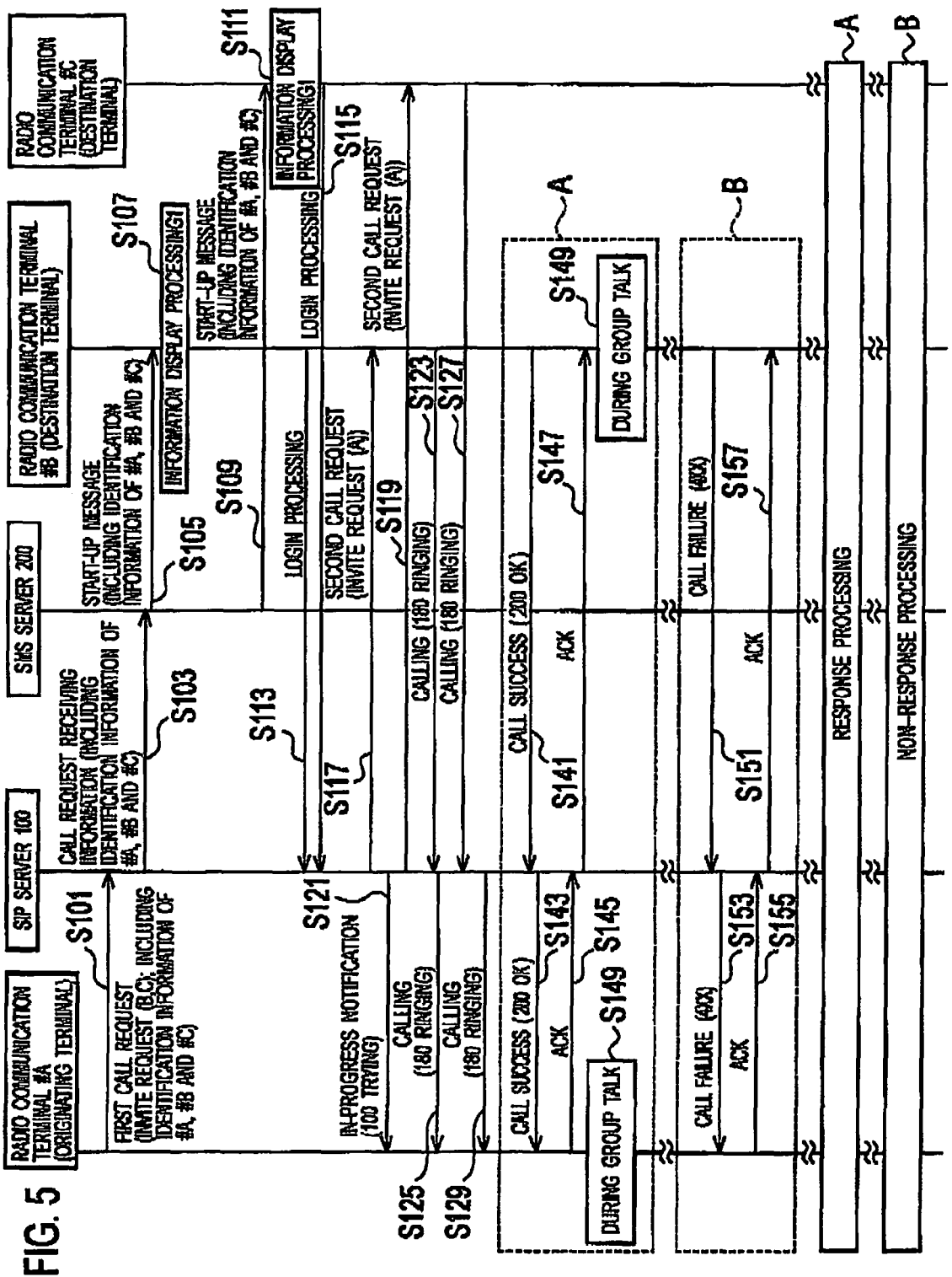
FIG. 5 is a flow diagram showing a communication method according to the first embodiment.

A communication method according to this embodiment will be described. Described first with reference to FIG. 5 is a communication method in which, among radio communication terminals #A, #B and #C, which are not participating in a group talk, the radio communication terminal #A (originating terminal) transmits the first call request (INVITE Request) for the radio communication terminal #B (destination terminal) and radio communication terminal #C (destination terminal). The non-group talk terminal (a terminal to join a group talk) mentioned hereinafter is described assuming that the non-group talk terminal comprises a radio communication terminal #A, radio communication terminal #B and radio communication terminal #C.

As shown in FIG. 5, in S101, the radio communication terminal #A transmits the first call request (INVITE Request (B, C)) for the radio communication terminal #B and radio communication terminal #C to a SIP server 100.

The first call request (INVITE Request (B, C)) includes member identification information which is the identification information of the non-group talk terminals. Here, the member identification information includes the identification information of the radio communication terminal #A, which is the originator of the first call request (INVITE Request (B, C)), and identification information of the radio communication terminal #B and the radio communication terminal #C, which are the destination of the first call request (INVITE Request (B, C)).

In S103, the SIP server 100 transmits, to the SMS server 200, call request receiving information on the basis of the first call request (INVITE Request (B, C)) received from the radio communication terminal #A. The call request receiving information indicates that the first call request (INVITE Request (B, C)) for the radio communication terminal #B and the radio communication terminal #C has been received from the radio communication terminal #A.

The call request receiving information includes the same member identification information as the member identification information included in the first call request (INVITE Request (B, C)).

In S105, SMS server 200 transmits a start-up message on the basis of the call request receiving information received from the SIP server 100, to the radio communication terminal #B. The start-up message starts up an application which executes a group talk.

The start-up message includes the same member identification information as the member identification information included in the call request receiving information.

In S107, on the basis of the start-up message received from the SMS server 200, the radio communication terminal #B starts up an application which executes a group talk and also displays identification information (for example, the identification information of the radio communication terminal #A and radio communication terminal #C) included the member identification information of the start-up message.

In addition, the radio communication terminal #B may display user information (such as the user names of the radio communication terminal #A and radio communication terminal #C and the like) corresponding to the identification information included in the member identification information by referring to the preset address book.

In S109, the SMS server 200, similarly to the processing of S105, transmits a start-up message to the radio communication terminal #C on the basis of the call request receiving information received from the SIP server 100. The start-up message starts up an application which executes a group talk.

The start-up message includes the same member identification information as the member identification information included in the call request receiving information.

In S111, similarly to the processing of S107, on the basis of the start-up message received from the SMS server 200, the radio communication terminal #C starts up an application which executes a group talk and also displays identification information (for example, the identification information of the radio communication terminal #A and radio communication terminal #B) included in the member identification information of the start-up message.

In S115, the radio communication terminal #B executes login processing to the SIP server 100 on the basis of the start-up message received from the SMS server 200.

In S115, the radio communication terminal #C executes login processing to the SIP server 100 on the basis of the start-up message received from SMS server 200.

In S117, after the completion of the login processing of S113, the SIP server 100 generates the second call request (INVITE Request (A)) for the radio communication terminal #B corresponding to the first call request (INVITE Request (B, C)) on the basis of the first call request (INVITE Request (B, C)) received from the radio communication terminal #A. Then, the SIP server 100 transmits the generated second call request (INVITE Request (A)) to the radio communication terminal #B.

In S119, after the completion of the login processing of S115, the SIP server 100 generates the second call. request (INVITE Request (A)) for the radio communication terminal #C corresponding to the first call request (INVITE Request (B, C)) on the basis of the first call request (INVITE Request (B, C)) received from the radio communication terminal #A. Then, the SIP server 100 transmits the generated second call request (INVITE Request (A)) to the radio communication terminal #C.

In S121, the SIP server 100 transmits an in-progress information (100 Trying) to the radio communication terminal #A. The in-progress information indicates that the processing of the second call request (INVITE Request (B, C)) for the radio communication terminal #B, and radio communication terminal #C is in progress.

In S123, the radio communication terminal #B transmits, to the SIP server 100, ringing information (180 Ringing) which indicates that a user of the radio communication terminal #B is being called.

In S125, the SIP server 100 transfers, to the radio communication terminal #A, the ringing information (180 Ringing) received from the radio communication terminal #B.

In S127, the radio communication terminal #C transmits, to the SIP server 100, ringing information (180 Ringing) which indicates that a user of the radio communication terminal #C is being called.

In S129, the SIP server 100 transfers, to the radio communication terminal #A, the ringing information (180 Ringing) received from the radio communication terminal #C.

In S141, the radio communication terminal #B transmits, to the SIP server 100, call success information (200 OK) which indicates that the response to the second call request (INVITE Request (A)) was successfully made when the user of the radio communication terminal #B carried out a response operation within predetermined time period. In addition, the predetermined time period is managed by a timer or the like mounted in the radio communication terminal #B.

In S143, the SIP server 100 transfers, to the radio communication terminal #A, the call success information (200 OK) received from the radio communication terminal #B.

In S145, the radio communication terminal #A transmits, to the SIP server 100, an ACK which indicates that the received call success information (200 OK) has been received.

In S147, the SIP server 100 transfers, to the radio communication terminal #B, the ACK received from the radio communication terminal #A.

In S149, the radio communication terminal #B establishes a session with the radio communication terminal #A on the basis of the ACK received from the SIP server 100. Then, the radio communication terminal #C also executes the same processing as the response processing A of S141 to S149. This allows the radio communication terminals #A to #C to establish a session thereamong and start a group talk among the radio communication terminals #A to #C.

Meanwhile, when the radio communication terminal #B and radio communication terminal #C execute non-response processing B of S151 to S157 (described later), no group talk among the radio communication terminals #A to #C starts. The details are as follows.

In S151, when the user of the radio communication terminal #B does not carry out a response operation within the predetermined time period, the radio communication terminal #B transmits, to the SIP server 100, call failure information (4xx) which indicates that the response to the second call request (INVITE Request (A)) has failed.

In S153, the SIP server 100 transfers, to the radio communication terminal #A, the call failure information (4xx) received from the radio communication terminal #B.

In S155, the radio communication terminal #A transmits, to the SIP server 100, an ACK which indicates that the call failure information (4xx) has been received.

In S157, the SIP server 100 transfers, to the radio communication terminal #B, the ACK received from the radio communication terminal #A.

When the user of the radio communication terminal #C does not carry out a response operation within the predetermined time period, the radio communication terminal #C, similarly to the radio communication terminal #A, executes the above mentioned response processing B of S151 to S157.

In addition, although the radio communication terminal #A, radio communication terminal #B and radio communication terminal #C are used for the explanation in the communication method shown in FIG. 5, the terminals are not limited to these radio communication terminals. It goes without saying that the same processing may be carried out by use of more than four radio communication terminals.

Described hereinafter in reference to FIG. 6 to FIG. 10 is a communication method according to the case where, among the radio communication terminals #A to #C which are already participating in a group talk (see, "during a group talk" in FIG. 6), the radio communication terminal #A (originating terminal) transmits the first call request for a radio communication terminal #D (destination terminal) which is not participating in the group talk.

Figure 6:
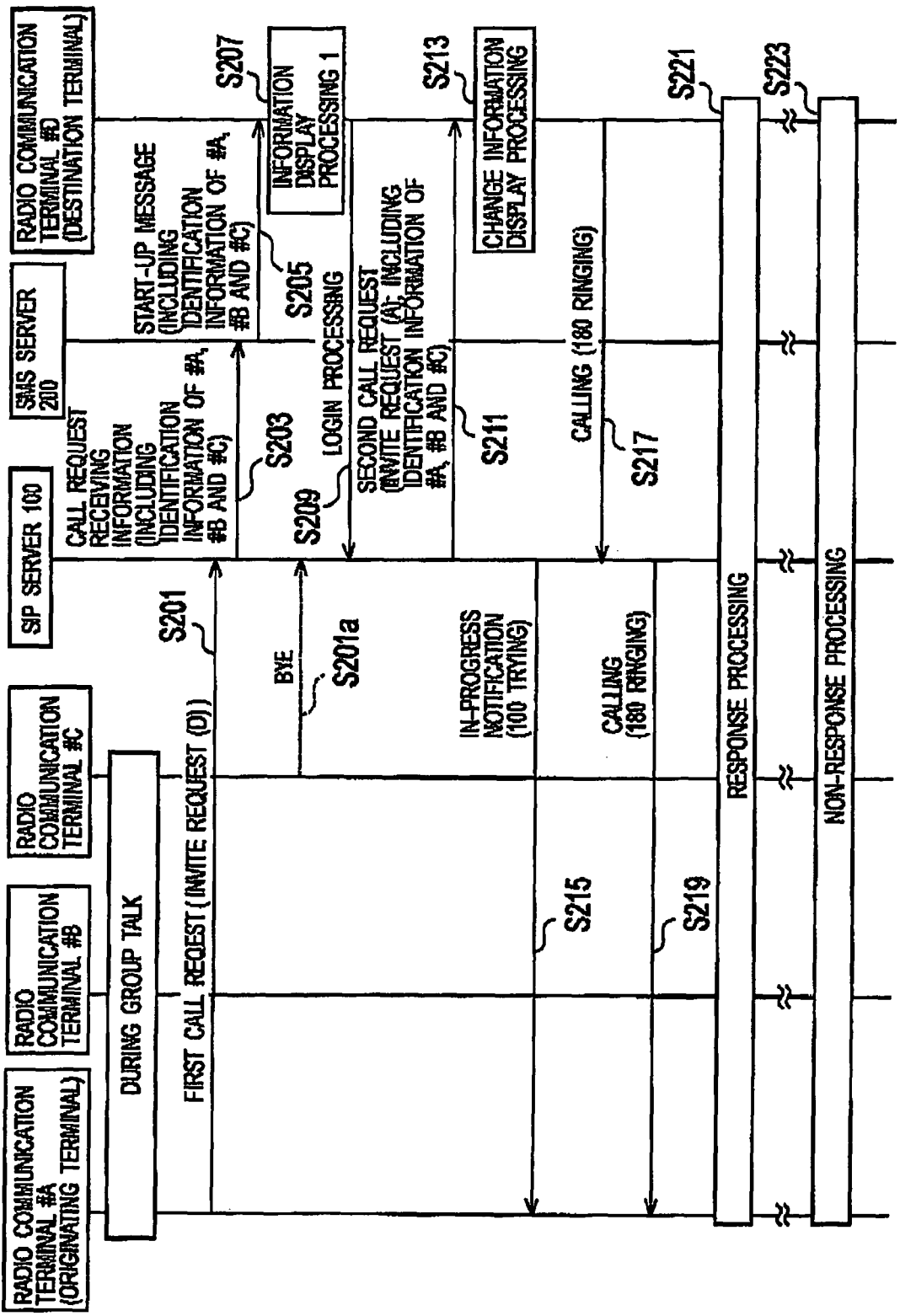
FIG. 6 is a flow diagram showing a communication method according to the first embodiment.

As shown in FIG. 6, in S201, the radio communication terminal #A transmits, to the SIP server 100, the first call request (INVITE Request (D)) for radio communication terminal #D.

In S203, the SIP server 100 transmits call request receiving information, to the SMS server 200, on the basis of the first call request (INVITE Request (D)) received from the radio communication terminal #A. The call request receiving information indicates that the first call request (INVITE Request (D)) to the radio communication terminal #D has been received from the radio communication terminal #A.

Here, in S203, the SIP server 100 is considered to manage the identification information of the group talk terminals as the member identification information. The group talk terminals include the radio communication terminal #A (originating terminal), which is the originator of the first call request (INVITE Request), and the radio communication terminals #B and #C, which are participating in the group talk with the radio communication terminal #A.

In this case, the SIP server 100 includes in the call request receiving information the member identification information. (the identification information of the radio communication terminals #A to #C) which is managed in the processing of S203. Then the SIP server 100 transmits the call request receiving information to the SMS server 200.

Meanwhile, in S203, the SIP server 100 is considered not to manage the identification information of the group talk terminals as the member identification information. The group talk terminals include the radio communication terminal #A (originating terminal), the originator of the first call request (INVITE Request), and the radio communication terminals #B and #C which are participating in the group talk with the radio communication terminal #A.

In this case, the SIP server 100 may include in the call request receiving information the same member identification information as the member identification information (radio communication terminals #A to #C; see M shown in FIG. 7) included in the first call request (INVITE Request (D)) received from the radio communication terminal #A. Then, the SIP server 100 may transmit the call request receiving information to the SMS server 200.

For example, when the radio communication terminal #A has already acquired the identification information of the radio communication terminals #B and #C, which are participating in the group talk, the radio communication terminal #A includes in the first call request (INVITE Request (D)) the member identification information comprising the identification information of the radio communication terminal #A, #B and #C. Then the radio communication terminal #A transmits the first call request (INVITE Request (D)) to the SIP server 100.

After that, the SIP server 100 includes in the call request receiving information the same member identification information as the member identification information (radio communication terminals #A, #B and #C) included in the first call request (INVITE Request (D)) received from the radio communication terminal #A. Then, the SIP server 100 transmits the call request receiving information to the SMS server 200.

Meanwhile, when the identification information of the radio communication terminals #B and #C, which are participating in the group talk with the radio communication terminal #A, has not been acquired yet, the radio communication terminal #A acquires the identification information of the radio communication terminals #B and #C from the radio communication terminals #B and #C. Then, the radio communication terminal #A includes in the first call request (INVITE Request (D)) the member identification information containing the identification information of the radio communication terminals #A to #C. After that, the radio communication terminal #A transmits the first call request (INVITE Request (D)) to the SIP server 100.

In S205, the SMS server 200 transmits to the radio communication terminal #D a start-up message to activate an application which executes a group talk on the basis of the call request receiving information received from the SIP server 100.

The start-up message includes the same member identification information as the member identification information included in the call request receiving information.

In S207, the radio communication terminal #D starts up an application which executes a group talk on the basis of the start-up message received from the SMS server 200, and displays the member identification information (the identification information of the radio communication terminals #A, #B and #C) included in the start-up message.

Figure 8:
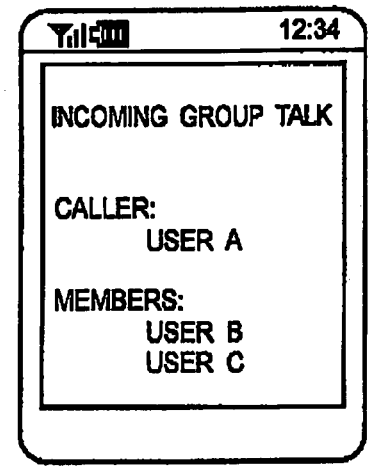
FIG. 8 is a view showing the contents of the screen for incoming call for group talk according to the first embodiment.
Figure 9:
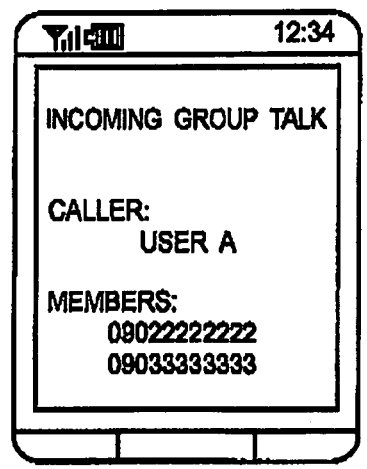
FIG. 9 is a view showing the contents of the screen for incoming call for group talk according to the first embodiment.

In addition, as shown in FIGS. 8 and 9, the radio communication terminal #D may display the user information (user names, phone numbers and the like of the radio communication terminal #A, radio communication terminal #B and radio communication terminal #C) corresponding to the member identification information by referring to the preset address book.

In S209, the radio communication terminal #D executes login processing to the SIP server 100 on the basis of the start-up message received from the SMS server 200.

In S211, after the login processing of S209 is completed, the SIP server 100 generates the second call request (INVITE Request (A)) for the radio communication terminal #D corresponding to the first call request (INVITE Request (D)) on the basis of the first call request (INVITE Request (D)) received from the radio communication terminal #A.

Upon completion of the login processing of S209, the SIP server 100 also generates the second call request (INVITE Request (A)) including the identification information (member identification information) of the group talk terminals or the non-group talk terminals. The non-group talk terminals are the ones involved in the group talk at the time of the SIP server 100's receiving the first call request (INVITE Request (D)), (including the terminals which are being called but has not joined a group talk yet).

In addition, when the identification information (member identification information) of the non-group talk terminals and group talk terminals is changed during the period after the SIP server 100 receives the first call. request INVITE Request (D)) before the SIP server 100 transmits the second call request (INVITE Request (A)), the SIP server 100 generates the second call request (INVITE Request (A)) including the change information indicating that there has been a change in the number of the non-group talk terminals or group talk terminals.

For example, suppose that the radio communication terminal #A, radio communication terminal #B and radio communication terminal #C were participating in the group talk at the time of S201, and then at the time of S201a the radio communication terminal #C transmitted to the SIP server 100 BYE information which indicates that the participation to the group talk discontinued.

In this case, the radio communication terminal #C leaves the group talk. Since the member identification information at the time of S201 is different from the member identification information at the time of S211, the SIP server 100 generates as change information the member identification information at the time of S211 (the identification information of the radio communication terminal #A and radio communication terminal #B), or the identification information difference between the member identification information at the time of S201 and the member identification information at the time of S211 (the identification information of the radio communication terminal #C). Then, the SIP server 100 generates the second call request (INVITE Request (A)) including the generated change information.

The SIP server 100 also transmits the generated second call request (INVITE Request (A)) to the radio communication terminal #D.

In S213, on the basis of the second call request (INVITE Request (A)) received from the SIP server 100, the radio communication terminal #D displays miscompare information indicating that there has been a change in the number of the group talk terminals on the basis of the change information included in the second call request (INVITE Request (A)) and the member identification information included in the start-up message.

This allows the users of the radio communication terminal #D to decide whether or not to participate in the group talk knowing that there has been a change in the to users of the non-group talk terminals or group talk terminals. Thus, the users are able to have a conversation with desired users more properly.

For example, when the member identification information included in the start-up message includes the identification information of the radio communication terminal #A, radio communication terminal #B and radio communication terminal #C, and the change information included in the second call request (INVITE Request (A)) includes the identification information of the radio communication terminal #A and radio communication terminal #B, which is the member identification information at the time of S211, or the identification information difference between the member identification information at the time of S201 and the member identification information at the time of S211 (the identification information of the radio communication terminal #C), the radio communication terminal operates as follows.

Figure 10:
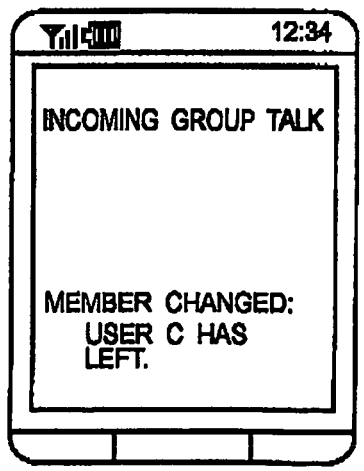
FIG. 10 is a view showing the contents of the screen for incoming call for group talk according to the first embodiment.

That is to say, when compared with the member identification information at the time of S201, the member identification information at the time of S211 does not include the identification information of the radio communication terminal #C, thus the radio communication terminal #D displays the miscompare information such as the fact that the user C of the radio communication terminal #C has left the group talk (see FIG. 10).

The processing of S215 to S223 is the same as the processing of S121 to S157 shown in FIG. 5 (except the processing of S127 and S129).

According to the above mentioned communication method, since the start-up message includes the member identification information, even when the login processing to the call control server is not executed, the radio communication terminal 300 is able to acquire the member identification information promptly because of the start-up message received before the login processing.

Although the radio communication terminal #A, radio communication terminal #B, radio communication terminal #C and radio communication terminal #D are used for the explanation in the communication method shown in FIG. 6, the terminals are not limited to these radio communication terminals. It goes without saying that the same processing may be carried out by use of more than five radio communication terminals.

It also goes without saying that the change information display processing of S213 shown in FIG. 6 may be carried out in the communication method of FIG. 5. For example, in the communication method of FIG. 5, upon completion of the login processing of S113 or S115, the SIP server 100 generates the second call request including the member identification information at the SIP server 100's receipt of the first call request.

In addition, when the member identification information is changed during the period between the receipt of the first call request and the transmission of the second call request, the SIP server 100 generates the second call request including the change information which indicates that there has been a change in the number of the non-group talk terminals or group talk terminals. In S117 or S119, the SIP server 100 transmits the generated second call request to the radio communication terminal (radio communication terminal #B or #C; a destination terminal).

Then, on the basis of the second call request (INVITE Request (A)) received from the SIP server 100 in S117 or S119, the radio communication terminal (radio communication terminal #B or #C; destination terminal) displays the miscompare information indicating that there has been a change in the number of the non-group talk terminals on the basis of the change information included in the second call request (INVITE Request (A)) and the member identification information included in the start-up message.

[Second Embodiment]

In the second embodiment, when each identification information included in the start-up message includes identification information of call refusal that refuses incoming calls (hereinafter referred to as incoming call refusal information), the radio communication terminal 300 displays that the start-up message includes the incoming call refusal information. Described below is a difference from the communication system and the communication method according to the first embodiment.

The storage unit 308 of the radio communication terminal 300 according to this embodiment stores refusal lists including incoming call refusal information that refuses incoming calls.

When the refusal list includes the incoming call refusal information included in the start-up message received from the SMS server 200, the communication processor 301 displays on an information display unit 305 refusal terminal information indicating that the start-up message includes the incoming call refusal information.

For example, when each identification information included in the start-up message received from the SMS server 200 includes, as the incoming call refusal information, identification information of a refusal radio communication terminal in. which a call is refused by the radio communication terminal 300, the communication processor 301 displays the refusal terminal information on the information display unit 305.

When the refusal list includes the identification information included in the received start-up message, the controller 309 controls the login processing to the SIP server 100 to prevent the login processing from being activated. For example, the controller 309 aborts the login processing to the SIP server 100.

Explained hereinafter is the information display processing 2 according to the embodiment in reference to FIGS. 11 to 14. The information display processing 1 (S107, S111 and S207) shown in FIGS. 5 and 6 will be replaced by the information display processing 2 shown in FIGS. 11 and 12. The processing other than the information display processing 2 shown in FIGS. 11 and 12 is the same as the processing of FIGS. 5 and 6.

Figure 11:
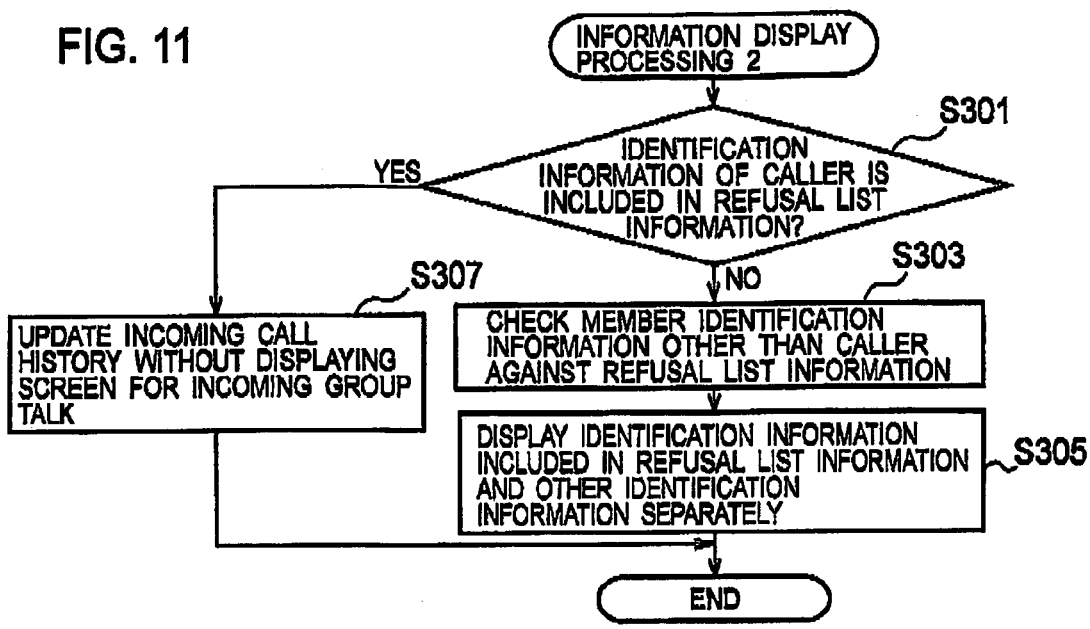
FIG. 11 is a flow diagram showing information display process according to a second embodiment.
Figure 12:
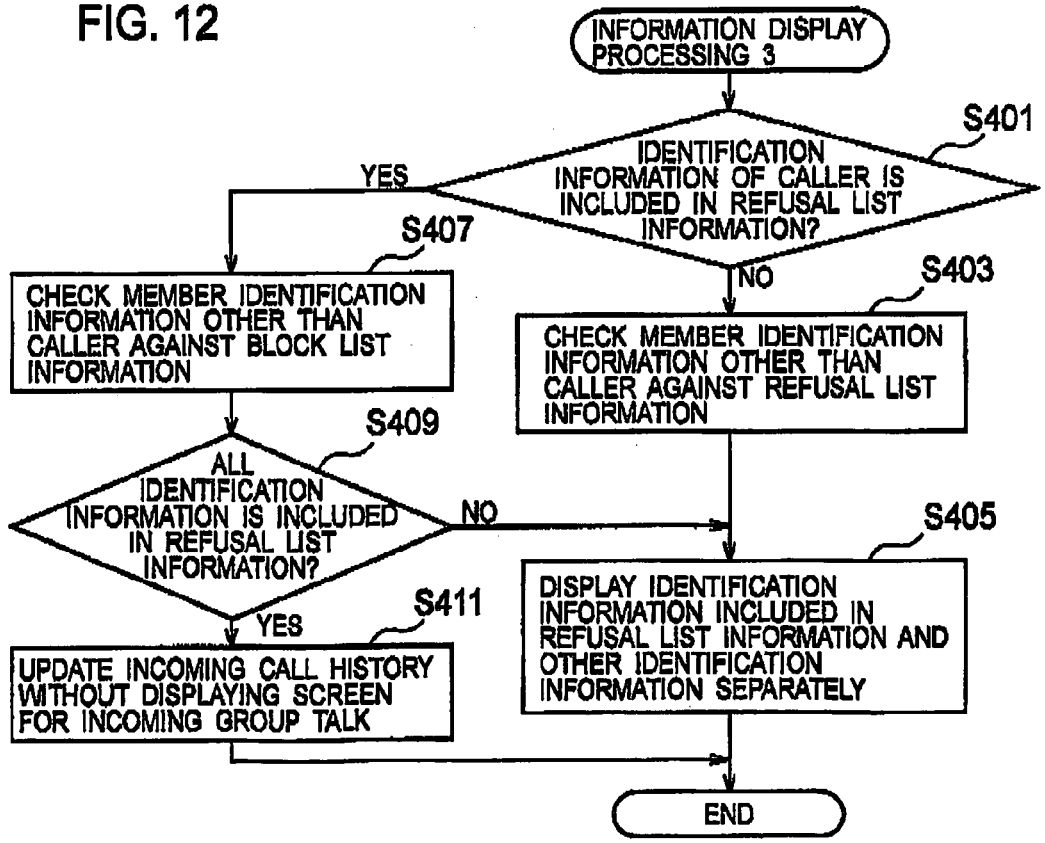
FIG. 12 is a flow diagram showing information display process according to a modified embodiment.

As shown in FIG. 11, in S301, on the basis of the member identification information included in the start-up message received from the SMS server 200, the radio communication terminal 300 (destination terminal) determines whether or not the refusal list includes the identification information of the originating terminal included in the member identification information. If the determination is YES, the radio communication terminal 300 proceeds to the processing of S307. If the determination is NO, the radio communication terminal 300 proceeds to the processing of S303.

In S303, the radio communication terminal 300 checks the member identification information other than the identification information of the originating terminal against the refusal list.

In S304, the radio communication terminal 300 displays the identification information among the member identification information. Here, the identification information included in the refusal list and the one not included in the refusal list are displayed separately.

For example, when the identification information of the originating terminal is "user A", and the member identification information other than the identification information of the originating terminal is "user B and user C", and the refusal list includes "user B", the radio communication terminal operates as follows.

Figure 13:
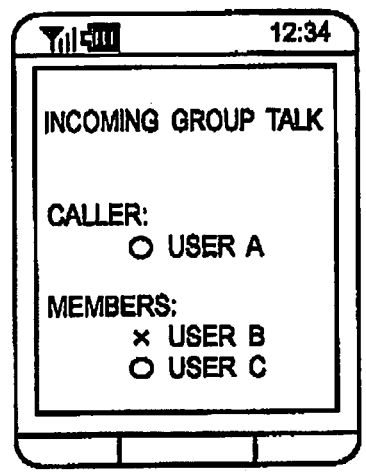
FIG. 13 is a view showing the contents of the screen for incoming calls for group talk according to the modified embodiment.

That is to say, as shown in FIG. 13, the radio communication terminal 300 displays "user B" and "x" (refusal terminal information) because user B is included in the refusal list. The radio communication terminal 300 displays "user A, user C" and "O" (allowed) because user A and user C are not included in the refusal list.

In S307, when the refusal list includes the identification information of the originating terminal "user A," the radio communication terminal 300 will not display the screen for incoming calls for group talk, the display screen for the member identification information, and will not execute login processing to the SIP server 100. Then the radio communication terminal 300 updates the call register on the basis of the identification information of the originating terminal and the member identification information.

According to such operation, when the refusal list includes the identification information included in the received start-up message, the radio communication terminal 300 displays the refusal terminal information. This allows the user of the radio communication terminal 300 to recognize that there is a user who intends to refuse joining the group talk by reference to the displayed refusal terminal information. In other words, the user of the radio communication terminal 300 is able to make a proper decision of whether or not to respond to the call from the originating terminal.

In the information display processing 2 shown in FIG. 11, when the refusal list includes "the identification information of the originating terminal" included in the member identification information, the radio communication terminal 300 does not display a screen for incoming calls for group talk in the first place. However, the following modification may be given without limiting to the above only.

Specifically, only when the refusal list includes "all" the identification information included in the member identification information, the radio communication terminal 300 may not display the screen for incoming calls for group talk, and may not execute the login processing to the SIP server 100. More details are shown hereinafter with reference to FIG. 12. Note that the processing from S401 to S405 shown in FIG. 12 will not be explained here because it is the same as the processing S301 to S305 shown in FIG. 11.

As shown in FIG. 12, in S407, the radio communication terminal 300 checks the member identification information other than the identification information of the originating terminal against the refusal list.

In S409, the radio communication terminal 300 determines whether or not the refusal list includes all the identification information included in the member identification information. If the determination is YES, the radio communication terminal 300 proceeds to the processing of S411. If the determination is NO, the radio communication terminal 300 proceeds to the processing of S405.

In S411, since the refusal list includes all the identification information included in the member identification information, the radio communication terminal 300 does not display a screen for incoming calls for group talk and execute the login processing to the SIP server 100, and updates the call register on the basis of the identification information of the originating terminal and the member identification information.

Figure 14:
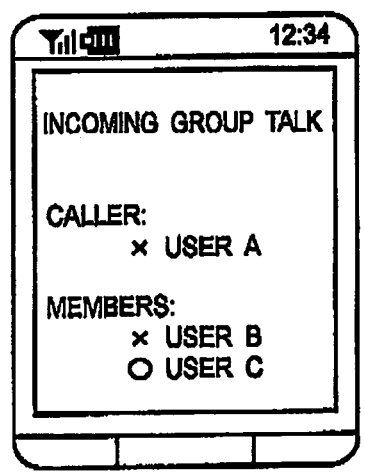
FIG. 14 is a view showing the contents of the screen for incoming calls for group talk according to the modified embodiment.

In addition, in S405, as shown in FIG. 14, the radio communication terminal 300 displays separately the identification information included in the refusal list (see, "x" in the figure) among the member identification information and the identification information not included in the refusal list (see, "o" in the figure) among the member identification information.

According to such operation, the radio communication terminal 300 may be configured not to execute unnecessary login processing to the SIP server 100 when a user to be refused becomes included in a group talk after receiving the start-up message from the SMS server 200.

Although described in the first embodiment and the second embodiment was the case when SIP is used as the communication protocol, the communication protocol to which the present invention is applicable is not limited to SIP. As long as the operation of the first embodiment and the second embodiment may be carried out, other communication protocol may also be used.

In addition, although the identification information included in the start-up message received from the SMS server 200 is used in the information display processing 2 shown in FIG. 11 and the information display processing 3 shown in FIG. 12, the identification information is not limited to this. The identification information included in the second call request received from the SIP server 100 may be used instead. In this case, instead of the login processing, disconnection processing will be executed to disconnect the communication path between the SIP server 100 and the radio communication terminal.

Described above is an example of the present invention only illustrating a specific example. The example does not particularly limit the present invention. The design of the specific configuration of each unit may be modified as needed. The configurations of each embodiment and modification may also be combined. In addition, the effects and advantages of each embodiment and modification is merely a list of the most preferred effects and advantages derived from the present invention, and the effects and advantages according to the present invention is not limited to the ones described in each embodiment and modification.

The entire contents of the Japanese Patent Application No. 2006-019483, filed on Jan. 27, 2006, are incorporated herein by reference.

INDUSTRIAL APPLICABILITY

As describe above, the communication system, radio communication terminal and display control method according to the present invention are useful in radio communication such as mobile communications because the radio communication terminal is able to acquire the member identification information promptly even when the radio communication terminal has not executed login processing to the SIP server.

The invention claimed is:

1. A communication system that enables a group talk, comprising:
   a call control server; and
   a message transmission server,
   wherein the call control server comprises:
      a call request receiver configured to receive a first call request for calling out group talk members;
      a call request generator configured to generate a second call request for calling out the group talk members corresponding to the first call request, on the basis of the received first call request; and
      a call request transmitter configured to transmit call request receiving information indicating that the first call request is received, prior to transmitting the generated second call request to the group talk members,
   wherein the message transmission server comprises:
      an information receiver configured to receive the call request receiving information transmitted from the call control server; and
      a start-up message transmitter configured to transmit a start-up message, which includes member identification information of the group talk, wherein
   a login processing is executed to the call control server on the basis of the start-up message, and
   the second call request is generated on the basis of the executed login processing.

2. A radio communication terminal, comprising:
   a storage unit configured to store incoming call refusal information for refusing an incoming call;
   a receiver configured to receive a start-up message for starting up a login processing to a call control server, from a message transmission server; and
   a display unit configured to display that the start-up message includes the incoming call refusal information when the incoming call refusal information includes identification information contained in the start-up message received by the receiver, wherein
   the login processing is executed to the call control server on the basis of the start-up message, and
   the receiver is configured to receive a second call request for calling out the group talk members corresponding to a first call request on the basis of the executed login processing.

3. The radio communication terminal according to claim 2, comprising:
   a controller configured to control such that the login processing to the group talk system is not started when the start-up message contains the incoming call refusal information.

4. A display control method, comprising the steps of:
   on the basis of member identification information of a group talk contained in a start-up message for starting the group talk and a login processing to a call control server, and on the basis of member identification information of the group talk which is notified after the login processing to the call control server, determining whether or not there is a difference between the member identification information notified after the login processing and the member identification information contained in the start-up message; and
   displaying that there is the difference when the difference exists, wherein
   the login processing is executed to the call control server on the basis of the start-up message, and
   a second call request for calling out group talk members is generated on the basis of the executed login processing.

* * * * *